(12) United States Patent
Sunaga et al.

(10) Patent No.: US 6,876,228 B2
(45) Date of Patent: Apr. 5, 2005

(54) FIELD PROGRAMMABLE GATE ARRAY (75) Inventors: Toshio Sunaga, Shiga-ken (JP);
Hisatada Miyatake, Shiga-ken (JP);
Kohji Kitamura, Shiga-ken (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/249,934

(22) Filed: May 20, 2003

(65) Prior Publication Data
US 2004/0041584 A1 Mar. 4, 2004

(30) Foreign Application Priority Data

Aug. 28, 2002 (JP) ........................................ 2002-248936

(51) Int. Cl.⁷ .......................................... H03K 19/177
(52) U.S. Cl. .............................. 326/40; 326/38; 326/41
(58) Field of Search ................................ 326/37, 1, 41, 326/46, 47

(56) References Cited

U.S. PATENT DOCUMENTS 5,541,529 A  7/1996  Mashiko et al.
6,326,651 B1  12/2001  Manabe
6,542,000 B1 *  4/2003  Black et al. .................. 326/39

* cited by examiner

Primary Examiner—Anh Q. Tran
(74) Attorney, Agent, or Firm—Margaret A. Pepper

(57) ABSTRACT

It is one object of the present invention to provide an FPGA for which the configuration time and the time required for rewriting connection information and logic structure information can be reduced, and for which the size of the area occupied can also be reduced. In order to store connection information for an FPGA, magnetic storage elements MTJ1 to MTJn, which are memory cells of an MRAM, are provided, and using a shift register 71, connection information is written to the magnetic storage elements MTJ1 to MTJn. The shift register 71 includes register elements SR1 to SRn, which correspond to the magnetic storage elements MTJ1 to MTJn, to which the connection information is serially input and stored. When the power is switched on, the connection information stored in the magnetic storage elements MTJ1 to MTJn is latched by latch elements LT1 to LTn, and is output to switching circuits 6 to interconnect logic blocks 51.

15 Claims, 5 Drawing Sheets

FIELD PROGRAMMABLE GATE ARRAY

BACKGROUND OF INVENTION

The present invention relates to a field programmable gate array (hereinafter referred to as an FPGA), and more particularly, to an FPGA for which a magnetic storage device is used.

Recently, as techniques for the fine structure of semiconductor devices have been developed and the manufacturing processes have become complicated, masks and manufacturing costs for ASICs (Application Specific Integrated Circuits), which are logic integrated circuits, have increased. Therefore, the cost of manufacturing ASICs can not be offset unless they can be mass produced. Thus, FPGAs are exploited, rather than ASICs, when only a small number of a specific type of logic circuits is required, or when a specific logic circuit is to be used as a prototype.

Conventionally, an FPGA is a large integrated circuit that can be used to create a user-designed arbitrary logic circuit. While on the one hand, to obtain a new ASIC an order for its manufacture must be placed with a maker, and the function of the ASIC that is thus obtained can not thereafter be changed, on the contrary, since the function of a new logic circuit design can be written to and implemented using a conventional FPGA, a user need not order a new integrated circuit from a maker; the user may prepare a working copy of the new logic circuit merely by changing the functional design of an FPGA.

Figure 6:
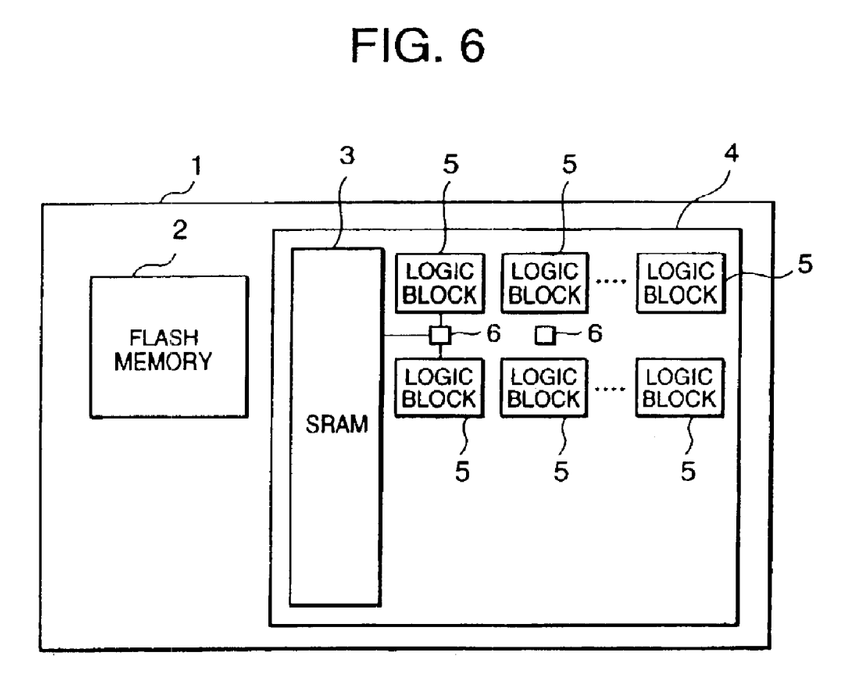
FIG. 6 is a functional block diagram showing the overall configuration of a conventional FPGA.

FIG. 6 is a functional block diagram showing the overall configuration of a conventional FPGA. In FIG. 6, an FPGA 4 includes a static random access memory (hereinafter referred to as an SRAM), multiple logic blocks 5 and multiple switching circuits 6.

The logic blocks 5 are programmable logic circuits, and include at least one latch circuit, or two or more (not shown). The latch circuit stores logic structure information for defining the logic structure of the logic block 5. The SRAM 3 stores connection information for the interconnection of the logic blocks 5. And the switching circuits 6 are connected between the logic blocks 5, and are turned on or off in accordance with the connection information stored in the SRAM 3. With this configuration, the logic blocks 5 are mutually connected or disconnected.

A flash memory 2, which is a nonvolatile semiconductor storage device, is also provided on a card 1 whereon the FPGA 4 is mounted. The connection information and the logic structure information are included in a user prepared program that is stored in the flash memory 2, and when the power is switched on, the connection information is transferred from the flash memory 2 to the SRAM 3. Based on this connection information, which is transferred from the flash memory 2 and stored in the SRAM 3, the switching circuits 6 of the FPGA 4 are turned on or off. Further, after the power is switched on, the logic structure information is transmitted directly from the flash memory 2 to the logic blocks 5, where it is stored. As a result, the logic structure desired by the user can be provided. Furthermore, the user can freely alter the FPGA logic circuit by changing the connection information and the logic structure information that is stored in the flash memory 2.

The manufacturing process technology of the flash memory differs greatly from that of the circuits in the FPGA 4, and the required voltage is higher than that required by the circuit device of the FPGA 4. Therefore, mounting the flash memory 2 and the FPGA 4 on the same chip is difficult, and instead of the flash memory 2, the SRAM 3 and the FPGA 4 being formed on the same chip, the flash memory 2 is formed on a separate chip. However, since the SRAM 3 is a volatile semiconductor storage device, conventionally, the connection information must be read from the external FPGA 4 each time the power is switched on, and is then transferred to the internal SRAM 3. Thus, it takes a long time until the FPGA 4 becomes ready for operations after power is turned on.

Furthermore, since the flash memory 2 and the FPGA 4 are mounted on different chips, and since multiple connecting lines are required to transmit the connection information from the flash memory 2 to the SRAM 3, the size of the card 1 is increased.

Further, to partially change a program held by the flash memory 2, all the stored data must be erased and the changed program rewritten. Therefore, in order to change part of the connection information or the logic structure information, the rewriting of data also takes a long time.

SUMMARY OF INVENTION

It is one object of the present invention to provide an FPGA for which the time required for configuration can be reduced.

It is another object of the present invention to provide an FPGA for which the time required for rewriting connection information or logic structure information can be reduced.

It is an additional object of the present invention to provide an FPGA for which the package size can be reduced.

According to the present invention, a field programmable gate array comprises: multiple logic blocks, a magnetic storage device and multiple switching means. The multiple logic blocks are programmable. The magnetic storage device stores connection information for interconnecting the logic blocks. And the multiple switching means are connected to the logic blocks and are turned on or off in accordance With the connection information stored in the magnetic storage device.

For the field programmable gate array, in accordance with the connection information stored in the magnetic storage device, the switching means are turned on or off and the logic blocks are interconnected and disconnected. As a result, a desired logic circuit can be provided. In this invention, since the connection information is stored in the magnetic storage device, the connection information is not lost, even when the power has been switched off. Therefore, once the connection information has been stored in the magnetic storage device, the restoration of like connection information is not required. With this configuration, when the power is switched on, the connection information is immediately transmitted from the magnetic storage device to the switching means, so that the configuration time can be reduced. Further, since unlike flash memory, rewriting to any cell is available for the magnetic storage device, the time required for rewriting the connection information can also be reduced. Moreover, since unlike the conventional case a flash memory need not be provided externally, the package size can be reduced.

It is preferable that the magnetic storage device be mounted on a chip on which the logic blocks and the switching means are mounted.

In this case, the magnetic storage device, as well as the logic blocks and the switching means, can more easily be formed on a chip than can the flash memory. As a result, the package size can be even further reduced.

It is preferable that the magnetic storage device include multiple magnetic storage elements, provided in correlation with the switching means and used to store connection information.

In this case, since all connection information is simultaneously transmitted from the magnetic storage elements to the multiple switching means, the configuration time can be still further reduced.

It is preferable that the field programmable gate array further comprise a shift register for externally and serially receiving connection information. This shift register includes multiple register elements, provided in correlation with the magnetic storage elements. Each of these register elements stores connection information, and outputs a corresponding magnetic storage element.

In this case, the connection information is serially transmitted to the shift register, and is output in parallel to the magnetic storage elements. Therefore, to receive the connection information only a small number of terminals need be prepared, and the chip and card area can again be further reduced.

It is preferable that the field programmable gate array include multiple latches, for latching the connection information output by the magnetic storage element.

In this case, since the latches amplify the information output by the magnetic storage elements, the magnetic storage elements can provide stable connection information for the switching means.

It is preferable that each of the logic blocks include a magnetic storage element, for storing logic structure information that defines the logic structure of a corresponding logic block.

In this case, since the logic structure information is stored in the individual magnetic storage elements, no logic structure information is lost when the power is switched off. Thus, once the logic structure information has been stored in the magnetic storage elements, the restoration of like logic structure information is not required. With this configuration, when the power is switched on, the logic for each logic block is immediately constituted in accordance with the logic structure information stored in the corresponding magnetic storage element. As a result, the configuration time can once more be additionally reduced.

DETAILED DESCRIPTION

The preferred embodiment of the present invention will now be described in detail while referring to the drawings. To avoid redundant explanations, the same reference numerals are used throughout to denote corresponding components.

Figure 1:
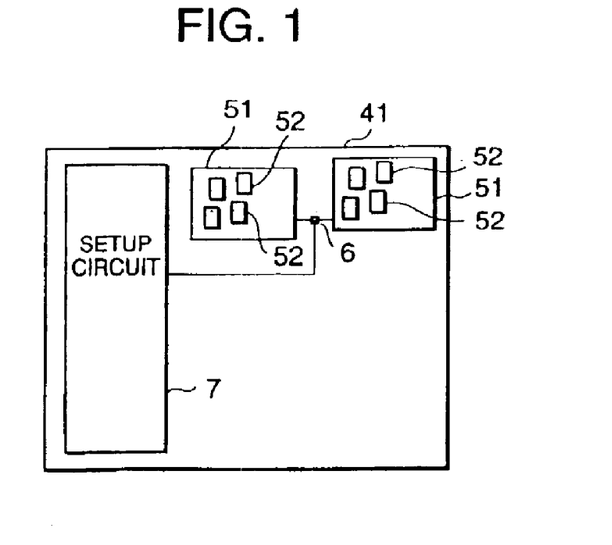
FIG. 1 is a functional block diagram showing the overall configuration of an FPGA according to one embodiment of the present invention.

FIG. 1 is a functional block diagram showing the overall configuration of an FPGA according to the embodiment of the present invention. In FIG. 1, an FPGA 41 comprises: multiple programmable logic blocks 51, multiple circuits 6 for interconnecting the logic blocks 51, and a setup circuit 7 for turning on or off the switching circuits 6 in accordance with user supplied, programmed connection information. In FIG. 1, although only two logic blocks 51 and one switch circuit 6 are shown, the FPGA 41 actually comprises many more logic blocks 51 and their corresponding switching circuits 6.

Each logic block 51 includes multiple lookup tables (hereinafter referred to as LUTs) 52, which function as desired logic circuits, such as NAND circuits or NOR circuits, in accordance with user supplied, programmed logic structure information.

Figure 2:
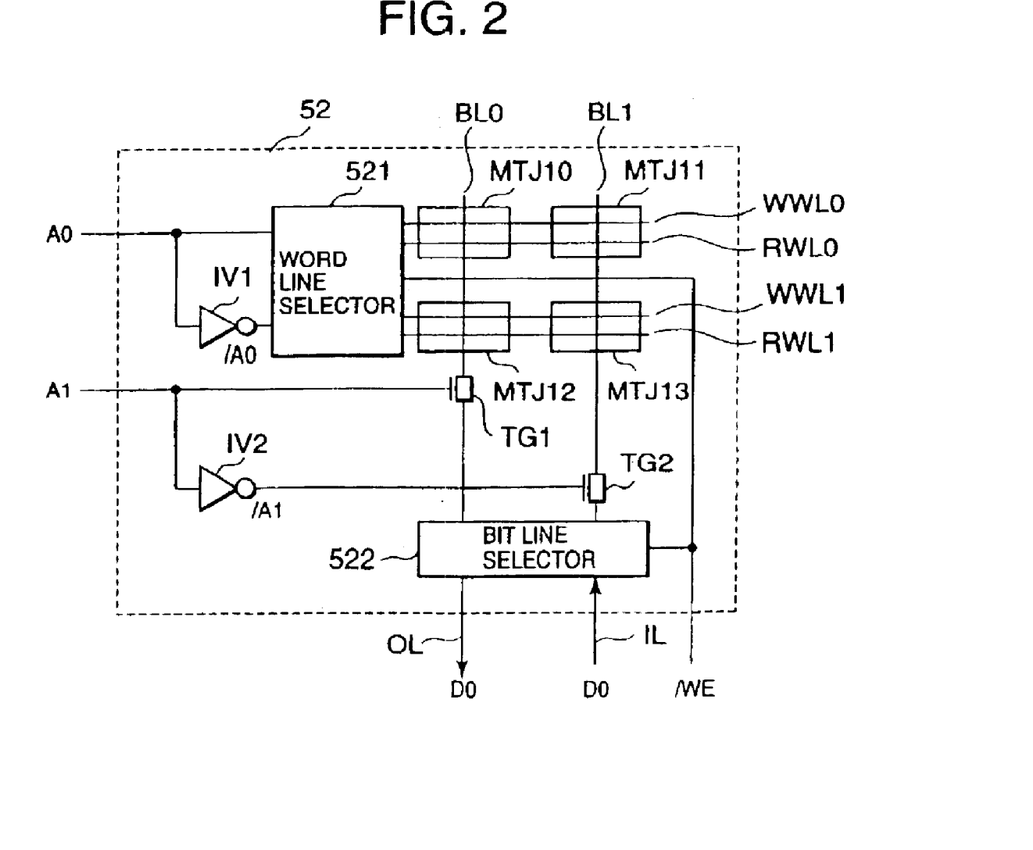
FIG. 2 is a functional block diagram showing the structure of one LUT in FIG. 1.

FIG. 2 is a functional block diagram showing an example structure for one of the LUTs 52 in FIG. 1. In FIG. 2, the LUT 52 includes inverters IV1 and IV2, transfer gates TG1 and TG2, a word line selector 521, a bit line selector 522, and magnetic storage elements MTJ10 to MTJ13. The magnetic storage elements are magnetic tunnel junction memory cells used for an MRAM (Magnetic Random Access Memory), for example.

The inverter IV1 receives an external address signal A0, which is also received by the word line selector 521, and outputs an inverted signal /A0 to the word line selector 521. The word line selector 521 is connected to write word lines WWL0 and WWL1 and to read word lines RWL0 and RWL1, and when a write enable signal /WE is rendered active, the word line selector 521 selects the write word line WWL0 or WWL1 in accordance with the address signals A0 and /A0. Specifically, the word line selector 521 selects the write word line WWL0 when the address signal A0 goes to level H (logic high), and selects the write word line WWL1 when the address signal A0 goes to level L (logic low). Then, when the write enable signal /WE becomes active, the word line selector 521 selects the read word line RWL0 or RWL1 in accordance with the address signals A0 and /A0. Specifically, the word line selector 521 selects the read word line RWL0 when the address signal A0 goes to level H (logic high), and selects the read word line RWL1 when the address signal A0 goes to level L (logic low).

The inverter IV2 receives an external address signal A1, which is also received by the transfer gate TG1, and outputs an inverted signal /A1 to the transfer gate TG2. Upon the reception of the address signal A1, the transfer gate TG1 is turned on, and the magnetic storage elements MTJ10 and MTJ12 are connected to the bit line selector 522 along a bit line BL0. Similarly, upon the reception of the address signal /A1, the transfer gate TG2 is turned on and the magnetic storage elements MTJ11 and MTJ13 are connected to the bit line selector 522 along a bit line BL1. The bit lines BL0 and BL1, and a data input line IL and a data output line OL are connected to the bit line selector 522, and with this configuration, the bit line selector 522 receives a data signal DI when the write enable signal /WE is rendered active, and outputs a data signal DO when the write enable signal /WE is rendered inactive.

To setup each of the LUTs 52 as a desired logic circuit, external address signals A1 and A2 are received for selecting one of the magnetic storage elements MTJ10 to MTJ13, and logic structure information to be stored in the selected magnetic storage element is received along the data input line IL. By repeating this process four times, logic structure information is stored in all the magnetic storage elements MTJ10 to MTJ13. As a result, each LUT 52 as a desired logic circuit. That is, in accordance with the address signals A1 and A2, which are received as input signals for a logic circuit, one magnetic storage element MTJ is selected, and the logic structure information stored in the selected magnetic storage element is output, along the data output line OL, as output signals for the logic circuit.

The LUT 52 in FIG. 2 includes the four magnetic storage elements MTJ10 to MTJ13. However, there are LUTs that include four magnetic storage elements or another number of magnetic storage elements. Further, since an address signal is used to select a magnetic storage element, a three bit address signal is transmitted to an LUT that includes, for example, eight ($=2^3$) magnetic storage elements.

Referring again to FIG. 1, the setup circuit 7 stores connection information for turning on or off the switching circuits 6, and based on the connection information, interconnects the logic blocks 51. In this manner, the logic structure of the FPGA 41 is set up.

Figure 3:
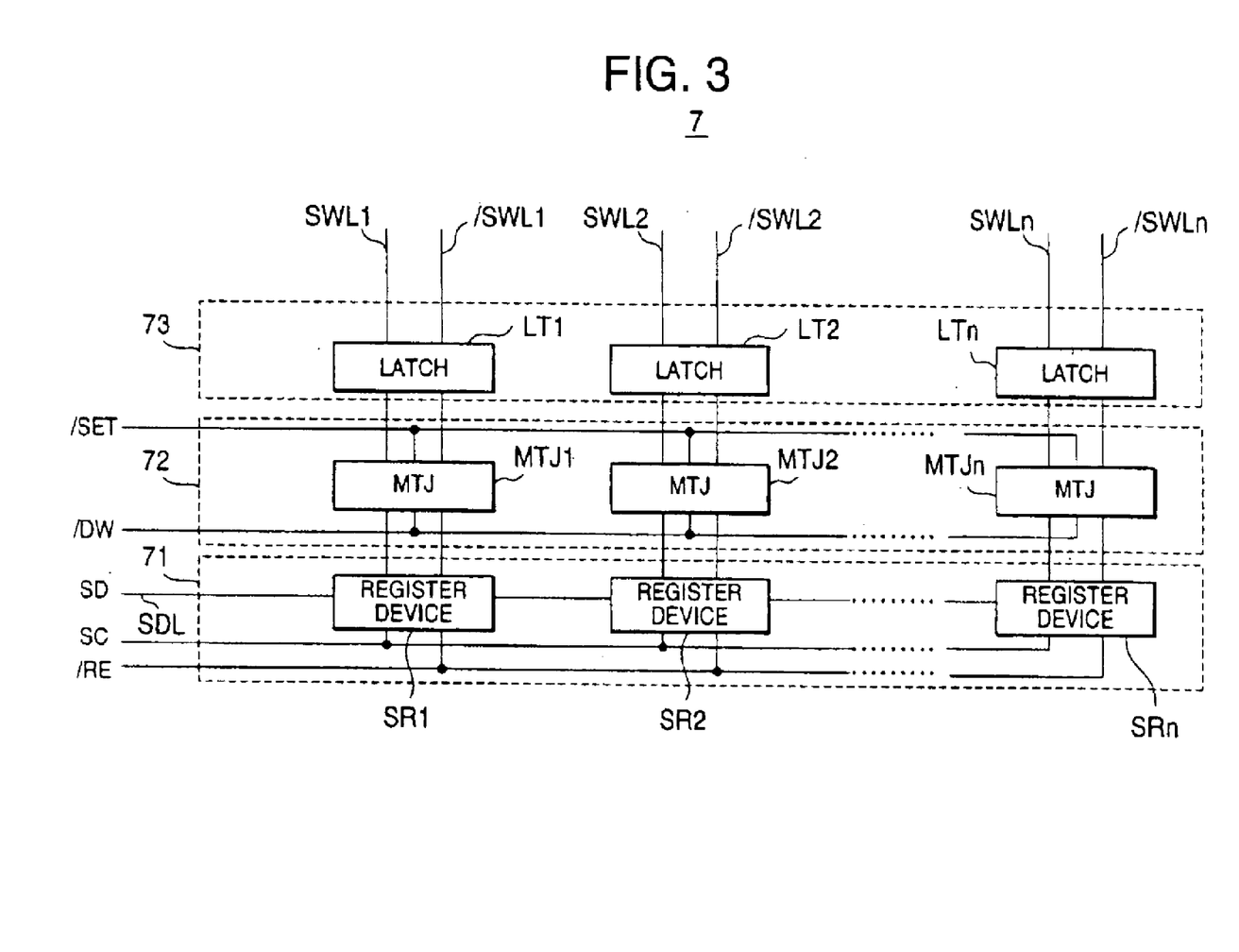
FIG. 3 is a functional block diagram showing the structure of a setup circuit in FIG. 1.

FIG. 3 is a functional block diagram showing the structure of the setup circuit 7 in FIG. 1. In FIG. 3, the setup circuit 7 includes a shift register 71, a magnetic storage device 72 and a latch circuit 73.

The shift register 71 includes multiple register elements SR1 to SRn (n is a natural number), which are connected in series. When a register enable signal /RE is activated, the shift register 71 receives connection information SD, which externally is input serially in accordance with a shift clock signal SC, and loads the connection information SD into the register elements SR1 to SRn. The register elements SR1 to SRn store the connection information SD, and output it to the magnetic storage device 72. It should be noted that the control signals, such as the register enable signal /RE and the shift clock signal SC, are output by an externally provided controller (not shown).

The magnetic storage device 72 includes multiple magnetic storage elements MTJ1 to MTJn, which are positioned adjacent to corresponding register elements SR1 to SRn. In response to a data write signal /DW, the magnetic storage elements MTJ1 to MTJn receive and store connection information originating at the register elements SR1 to SRn. Further, in response to a set up signal /SET, the magnetic storage elements MTJ1 to MTJn output the connection information to the latch circuit 73.

The latch circuit 73 includes multiple latch elements LT1 to LTn, which are positioned relative to corresponding magnetic storage elements MTJ1 to MTJn. The latch elements LT1 to LTn latch the connection information output by the magnetic storage elements MTJ1 to MTJn, and also function as buffers for amplifying the information output by the magnetic storage elements MTJ1 to MTJn.

The register element SR1, the magnetic storage element MTJ1 and the latch element LT1 are connected along switching signal lines SWL1 and /SWL1. Along the switching signal lines SWL1 and /SWL1, connection information stored in the register element SR1, the magnetic storage element MTJ1 and the latch element LT1 are exchanged, and complementary signals are transmitted to the switching circuit 6. Similarly, the register element SRn, the magnetic storage element MTJn and the latch element LTn are connected along the switching signal lines SWLn and /SWLn.

Referring again to FIG. 1, the switching circuits 6 are connected between the logic blocks 51, and are switched on or off in accordance with the connection information stored in the setup circuit 7, while the logic blocks 51 are interconnected or disconnected.

The operation of the thus arranged FPGA 41 will now be described.

First, an explanation will be given for an operation performed when each LUT 52 is set up as a desired logic circuit based on the externally input logic structure information. In this embodiment, an example is given wherein a LUT 52 is set up as an AND circuit.

In order to set up the LUT 52 as an AND circuit, the data values "1", "0", "0" and "0" are written to the magnetic storage elements MTJ10, MTJ11, MTJ12 and MTJ13 as logic structure information. The data value "1" represents a case wherein the data signal DI, input along the data input line IL, is at level H, and the data value "0" represents a case wherein the data signal DI, input along the data input line IL, is at level L.

Figure 4:
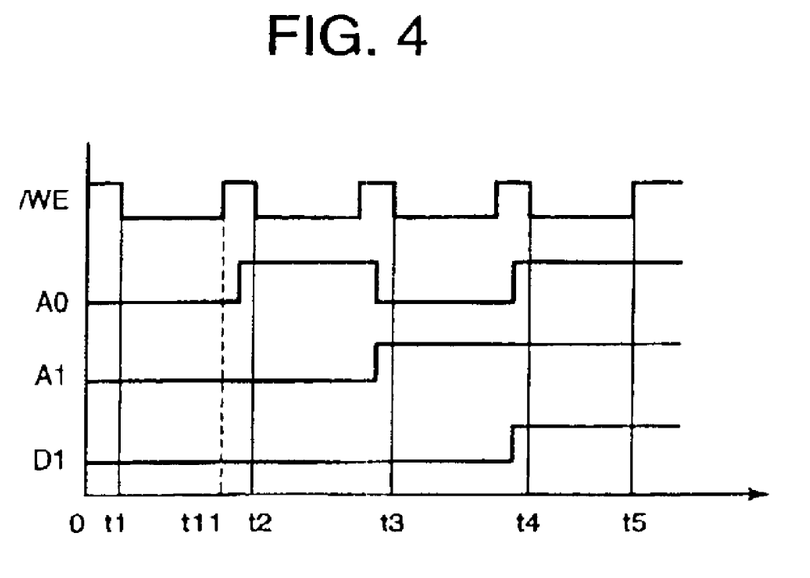
FIG. 4 is a timing chart showing the operation performed to set up the LUT in FIG. 2 as an AND circuit.

FIG. 4 is a timing chart showing the operation performed to set up the LUT 52 as an AND circuit. In FIG. 4, level H and level L for the write enable signal /WE are repeated at a predetermined interval. When at time t1 the write enable signal /WE is activated at level L, both of the address signal A0 and A12 are at level L. Thus, the word line selector 521 selects the write word line WWL1, and while the transfer gate TG1 is turned off, the transfer gate TG2 is turned on. As a result, the magnetic storage element MTJ13 is selected. At this time, since the data signal DI, input along the data input line IL, is at level L, the data value "0" is written to the magnetic storage element MTJ13. At time t11, which is a predetermined time period later than time t1, the write enable signal /WE is rendered inactive, going to level H, and the writing operation is temporarily terminated.

At time t2, which is a predetermined time period later than time t11, the write enable signal /WE is again activated and goes to level L. At this time, since the address signal A0 is at level H, the word line selector 521 selects the write word line WWL0. Further, since the address signal A1 is at level L, while the transfer gate TG1 is turned off, the transfer gate TG2 is turned on. As a result, the magnetic storage element MTJ11 is selected. At this time, since the data signal DI input along the data input line IL is at level L, the data value "0" is written to the magnetic storage element MTJ11.

At time t3, which is a predetermined time period later than time t2, the write enabler signal /WE is activated again at level L. Since the address signal A0 is at level L, the word line selector 521 selects the write word line WWL1. And since the address signal A1 is at level H, the transfer gate TG1 is turned on and the transfer gate TG2 is turned off, so that the magnetic storage element MTJ12 is selected. At this time, since the data signal DI, input along the data input line IL, is at level L, the data value "0" is written to the magnetic storage element MTJ12.

At time t4, whereat the write enable signal /WE is at level L, the address signal A0 is at level H, and the word line selector 521 selects the write word line WWL0. Also, since the address signal A1 is at level H, while the transfer gate TG1 is turned on, the transfer gate TG2 is turned off. As a result, the magnetic storage element MTJ10 is selected. At this time, since the data signal DI, input along the data input line IL, is at level H, the data value "1" is written to the magnetic storage element MTJ10. Then, at time t5, which is a predetermined time period later than time t4, the write enable signal /WE goes to level H and the logic setting operation for the LUT 52 is terminated.

Through the above operation, the LUT 52 functions as an AND circuit. That is, when both the address signals A0 and A1 are "0", the magnetic storage element MTJ13 is selected, and the data value "0", stored in the element MTJ13, is output along the data output line OL. While when the address signal A0 is "0" and the address signal A1 is "1", the magnetic storage element MTJ12 is selected, and the data value "0" stored therein is output along the data output line OL. Then, when the address signal A0 is "1" and the address signal A1 is "0", the magnetic storage element MTJ11 is selected, and the data value "0" stored therein is output along the data output line OL. Thereafter, when both the address signals A0 and A1 are "0", the magnetic storage element MTJ10 is selected, and the data value "1" is output along the data output line OL.

For the FPGA 41, the logic structure of the logic block 51 can be changed by altering the data input to the magnetic storage elements MTJ10 to MTJ13 in the LUT 52. Since the LUT 52 in FIG. 2 has four magnetic storage elements, the number of data combinations that can be stored is 16 ($=2^4$). Therefore, in accordance with the data combination stored in the magnetic storage elements, the LUT 52 can be set to 16 different logic circuits, including a NAND circuit and a NOR circuit. Similarly, an LUT that includes, for example, eight magnetic storage elements can be set to 256 ($=2^8$) different logic circuits. Therefore, for the multiple LUTs in the FPGA 41, the same logic structure information is input to the LUTs that are set up for the same logic circuit, and different logic structure information is input to the LUTs that are set up for different logic circuits.

Further, since nonvolatile storage elements are employed as storage elements for the LUTs 52, even when the power is switched off the logic structure information stored in each LUT 52 can be retained in the magnetic storage elements MTJ10 to MTJ13. Therefore, the time required for configuration is reduced, compared with that required for the conventional FPGA. This is because the conventional FPGA can not be operated unless the logic structure information is transmitted to each LUT and the function of each LUT is set up each time the power is switched on, while the FPGA 41 does not need such a operation, and can be operated immediately after the power is switched on.

Figure 5:
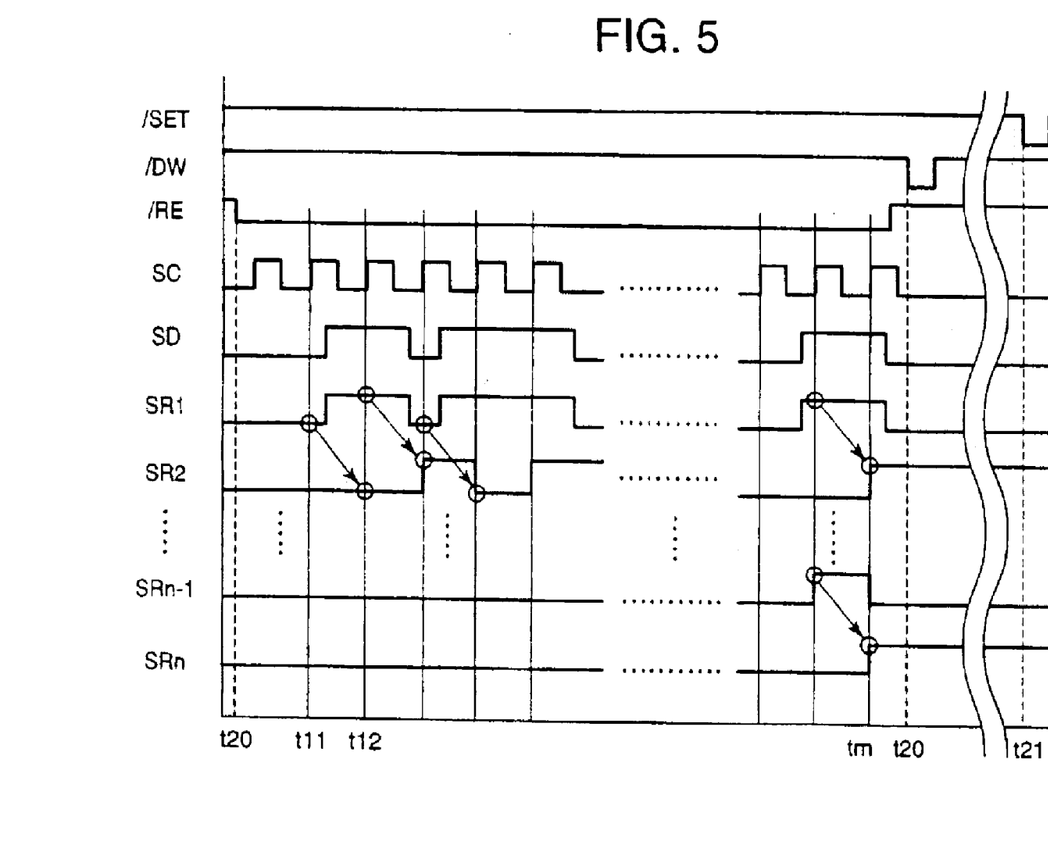
FIG. 5 is a timing chart showing the operation performed to transmit connection information to the setup circuit in FIG. 3.

An operation for connecting the logic blocks 51 based on the connection information will now be described. FIG. 5 is a timing chart showing the operation wherein the information for the connection of the logic blocks 51 is input to the setup circuit 7 of the FPGA 41.

In FIG. 5, at time t10, the register enable signal /RE is activated. At this time, both a set signal /SET and a data write signal /Dw are in the inactive state (level H). Then, in response to the activated register enable signal /RE, the writing of data to the register elements SR1 to SRn is enabled.

The connection information SD is serially input to the shift register 712 along the shift data line SDL. While the connection information is written to each register element SR when the shift clock signal SC falls to level L, and is output to the next register element when the shift clock signal SC again rises to level H.

The waveforms of the register elements SR1 to SRn in FIG. 5 represent voltage levels at the input nodes of the register elements SR1 to SRn. At time t11, the register element SR1 receives the connection information SD (at level L at this time) along the shift data line SDL, and latches it. Then, at time t12, the register element SR1 outputs the latched connection information SD to the register element SR2 at the next stage. Thereafter, the register elements SR1 to SRn latch the one bit connection information SD, and the writing of data for the register elements SR1 to SRn is terminated at time tm, whereat n bits of data is transmitted to the shift register 71, along the shift data line SDL, as the connection information SD. At this time, all the register elements SR1 to SRn store the connection information SD. Then, after the writing operation is terminated, the register enable signal /RE is deactivated at level H.

Sequentially, at time t20, the data write signal /DW, which is a one-shot, pulse signal, is activated at level L. At this time, the registers SR1 to SRn simultaneously output the stored connection information SD to the magnetic storage elements MTJ1 to MTJn. As a result, the magnetic storage elements MTJ1 to MTJn store the connection information SD.

The above described operation is performed only during the manufacturing of the FPGA 41, or when a user changes the connection information.

When the power is switched on (time t21), the set signal /SET is activated at level L. Then, since the set signal /SET is output as a one-shot pulse each time the power is switched on, the connection information stored in the magnetic storage elements MTJ1 to MTJn is simultaneously output to the latch elements LT1 to LTn.

The latch elements LT1 to LTn latch the connection information output by the corresponding magnetic storage elements MTJ1 to MTJn, amplify the voltage level for the information to a CMOS level, and output the connection information to the corresponding switching circuits 6. Upon the reception of the connection information from the latch elements LT1 to LTn, the corresponding switching circuits 6 are turned on or off. And as a result, the logic blocks 51 are connected as programmed by the user.

Through the above operation, the input of the connection information to the FPGA 41 can be completed, and the logic blocks 51 can be connected based on the connection information stored in the magnetic storage device 72. Since the magnetic storage elements MTJ1 to MTJn are nonvolatile, the connection information stored in the magnetic storage elements MTJ1 to MTJn is retained, even when the power is switched off, and each time the power is switched on, the writing of the connection information is not required for the FPGA 41. Therefore, the configuration time is reduced compared with the time required for the conventional FPGA 41. Specifically, several tens of msec are required for the configuration of the conventional FPGA, while only several msec or fewer are required for the configuration of the FPGA 41.

Further, since the connection information is temporarily input to the shift register 71, and is then output to the magnetic storage elements MTJ1 to MTJn, the shift register 71 must include only one terminal to receive the external connection information. Therefore, unlike the conventional FPGA, many lines do not need to be provided inside the FPGA to receive the connection information. And as a result, the size of the area occupied can be reduced.

The preferred embodiment of the present invention has been described; however, this embodiment is merely an example given for the implementation of the present invention. The present invention is not limited to the above embodiment, and the embodiment can be variously modified without departing from the scope of the invention.

What is claimed is:

1. A field programmable gate array comprising:
   multiple programmable logic blocks;
   a magnetic storage device for storing connection information for interconnecting said programmable logic blocks;
   multiple switching means being connected to said programmable logic blocks and being turned on or off in accordance with said connection information stored in said magnetic storage device; and a shift register for externally and serially receiving connection information, wherein said magnetic storage device includes multiple magnetic storage elements, provided in correlation with said switching means and used to store connection information, and wherein said shift register includes multiple register elements, provided in correlation with said magnetic storage elements, and each of said register elements stores connection information, and outputs a corresponding magnetic storage element.

2. A field programmable gate array comprising:

multiple programmable logic blocks;

a magnetic stoage device for storing connection information for interconnecting said programmable logic blocks;

multiple switching means being connected to said programmable logic blocks and being turned on or off in accordance with said connection information stored in said magnetic storage device; and a shift register for externally and serially receiving connection information, wherein said magnetic storage device is mounted on a chip on which said programmable logic blocks and said switching means are mounted, and wherein said magnetic storage device includes multiple magnetic storage elements, provided in correlation with said switching means and used to store connection information, and wherein said shift register includes multiple register elements, provided in correlation with said magnetic storage elements, and each of said register elements stores connection information, and outputs a corresponding magnetic storage element.

3. A field programmable gate array according to claim 1, further comprising:

multiple latches, for latching said connection information output by said magnetic storage element.

4. A field programmable gate array according to claim 1, wherein each of said programmable logic blocks includes a magnetic storage element, for storing logic structure information that defines the logic structure of a corresponding programmable logic block.

5. A field programmable gate array according to claim 1, further comprising:

multiple latches, for latching said connection information output by said magnetic storage element.

6. A field programmable gate array according to claim 2, further comprising:

multiple latches, for latching said connection information output by said magnetic storage element.

7. A field programmable gate array according to claim 2, further comprising:

multiple latches, for latching said connection information output by said magnetic storage element.

8. A field programmable gate array according to claim 1, wherein said magnetic storage device is mounted on a chip on which said programmable logic blocks and said switching means are mounted, and wherein each of said programmable logic blocks includes a magnetic storage element, for storing logic structure information that defines the logic structure of a corresponding programmable logic block.

9. A field programmable gate array according to claim 1, wherein each of said programmable logic blocks includes a magnetic storage element, for storing logic structure information that defines the logic structure of a corresponding programmable logic block.

10. A field programmable gate array according to claim 2, wherein each of said programmable logic blocks includes a magnetic storage element, for storing logic structure information that defines the logic structure of a corresponding programmable logic block.

11. A field programmable gate array according to claim 1, wherein each of said programmable logic blocks includes a magnetic storage element, for storing logic structure information that defines the logic structure of a corresponding programmable logic block.

12. A field programmable gate array according to claim 2, wherein each of said programmable logic blocks includes a magnetic storage element, for storing logic structure information that defines the logic structure of a corresponding programmable logic block.

13. A field programmable gate array according to claim 3, wherein each of said programmable logic blocks includes a magnetic storage element, for storing logic structure information that defines the logic structure of a corresponding programmable logic block.

14. A field programmable gate array according to claim 5, wherein each of said programmable logic blocks includes a magnetic storage element, for storing logic structure information that defines the logic structure of a corresponding programmable logic block.

15. A field programmable gate array according to claim 1, wherein said magnetic storage device is mounted on a chip on which said programmable logic blocks and said switching means are mounted.

* * * * *